April 26, 1949.
G. W. PAWEL
2,468,103
PRODUCTION OF FERRO-NICKEL
Filed March 4, 1946
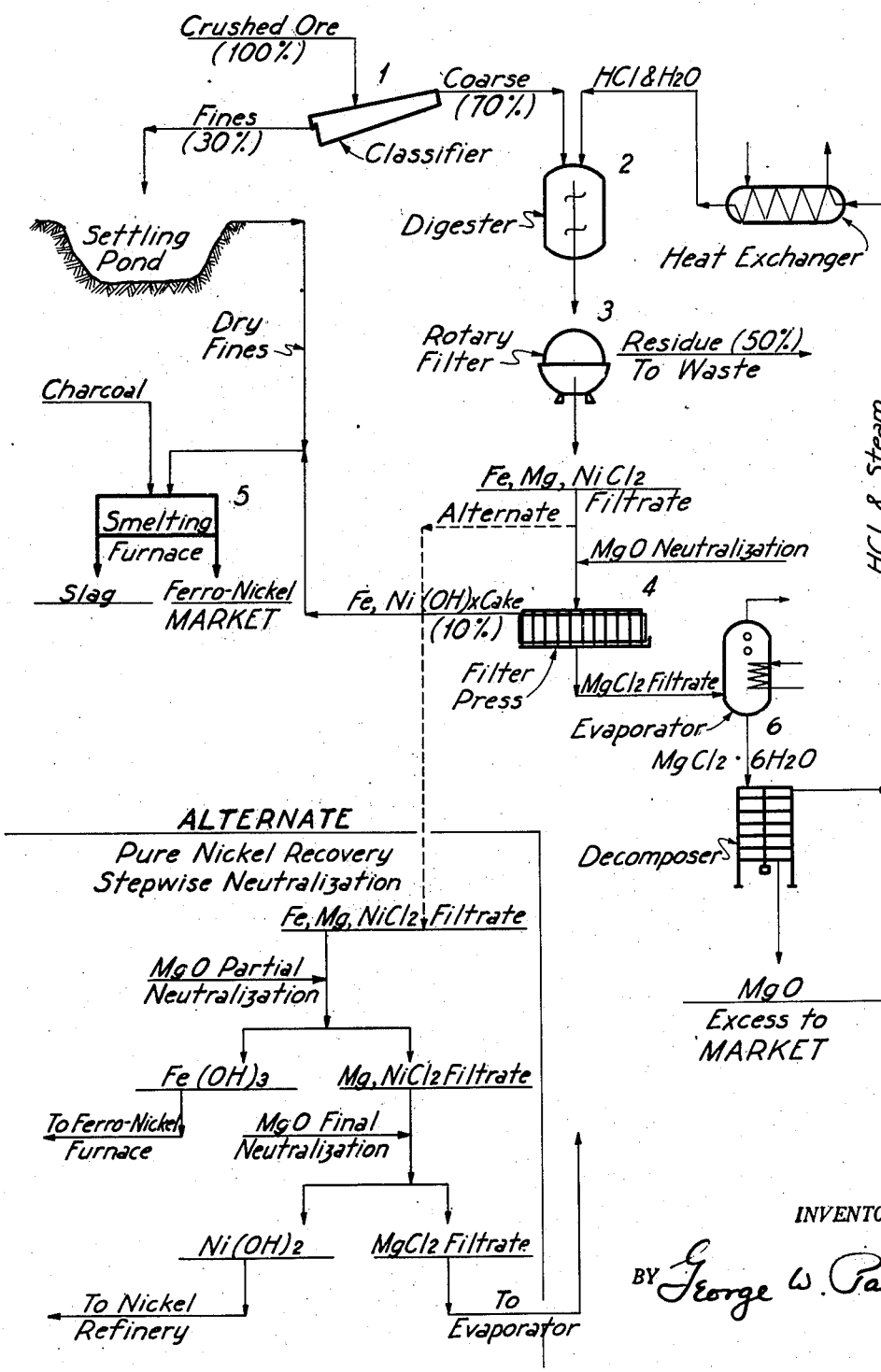
INVENTOR.
BY George W. Pawel Patented Apr. 26, 1949

2,468,103

UNITED STATES PATENT OFFICE 2,468,103

PRODUCTION OF FERRONICKEL

George W. Pawel, Norris, Tenn.

Application March 4, 1946, Serial No. 651,917

6 Claims. (Cl. 75—133.5)

This invention proposes a practical method for the beneficiation of low grade nickel silicate ores and the production of ferro-nickel from the resulting concentrates. The method does not apply to the treatment of the lateritic type of iron-nickel ores in which ferric oxide predominates but rather to the high magnesia garnierites an example of whose composition may be given roughly as follows:

| | Per cent |
|---|---|
| MgO | 20 |
| SiO2 | 40 |
| Fe2O3 | 15 |
| NiO | 3 |
| Cr2O3, MnO2, etc. | 4 |
| Ign. loss | 18 |
| | 100 |

Such ores have been mined in New Caledonia, Brazil, Celebes, Urals, etc., the usual refining practice aiming at the elimination of the 60% of MgO·SiO2 by straight electric furnace smelting or the separation of it as a slag from the molten metallic sulphides. Either of these methods calls for relatively large amounts of energy, fuel and/or raw materials which are not ordinarily cheaply available in those remote parts of the world where the garnierite ores abound.

It is the object of this invention, therefore, to present a process for extracting the nickel from these low grade silicates in a reasonably simple manner and with the expenditure of a minimum of energy and raw materials.

My previous patent application entitled, "Method for production of ferro-nickel," Serial #612,407, now abandoned, on which the present specifications are believed to be an improvement, similarly describes the procedures by which low grade garnierites can thus be beneficiated and their values recovered in the form of ferro-nickel. The successive steps by which such results are achieved may be broken down as follows:

1. Digestion of the raw ground ore with hydrochloric acid.
2. Neutralization of the #1 acid slurry with an excess of MgO.
3. Separation of the MgCl2 liquors from the bulk solids by filtration.
4. Washing and hydraulic classification of #3 solids into (1) a coarse reject, and (2) a fines recoverable fraction.
5. Smelting of the fines fraction to ferro-nickel.
6. Evaporation and decomposition of the MgCl2 (#3) into HCl and MgO for cyclic reuse in #(1) and #(2) respectively.

These same six steps are retained in the present method but they are carried out in a different order of sequence. The two specifications therefore tie in completely but for most purposes I consider the operation of the present new proposal more convenient, practical and effective than the methods recommended under the former specifications.

Reference to the accompanying flow-sheet will show these steps now arranged in the following sequence:

1. Classification of the raw ground ore into a fines and a coarse fraction.
2. Digestion of the coarse fraction with hydrochloric acid.
3. Filtration of the #2 acid slurry and rejection of the washed insolubles.
4. Neutralization of the #3 filtrate with MgO and filtration of the resulting iron-nickel hydroxide precipitate.
5. Smelting of the #4 precipitate combined with #1 fines.
6. Evaporation and decomposition of the MgCl2 (#4) into HCl and MgO for cyclic reuse in #3 and #4 respectively.

The advantages of this order of procedure are explained as follows:

The immediate classification of the raw ground ore into fines and coarse fractions (step #1) removes at once from the cycle of operations fully one-third of the total ore heads in the form of high iron fines which, although providing an excellent, easy melting feed for the ferro-nickel furnaces (step #5), would otherwise by their chemical and physical nature be very troublesome to handle in the later leaching and filtering operations. The chemical composition of these fines can be very flexible and it depends not only on the character of the ore feed but on its mesh size and on the sharpness of the classification. I have found that this type of garnieritic ore, whatever its origin, has practically the same composition chemically and much the same physical characteristics. A 20-mesh grind of any representative garnieritic ore, lightly tumbled or log-washed, serves to disintegrate into a soft fines fraction and a harder undecomposed fraction. In any modern hydraulic classifier then, it is readily possible to wash out and remove at least a third of the heads in the shape of fines carrying some 40% of the original iron and nickel. A typical analysis of such fines will show

| | Per cent |
|---|---|
| $Fe_2O_3$ | 20 |
| NiO | 4 |
| MgO | 15 |
| $SiO_2$ | 42 |

The remaining coarse product of the hydraulic classification, now freed from most of its troublesome slimes and soluble iron constituents, not only requires less than half as much acid (HCl) to leach out its content of nickel but yields a slurry much smaller in volume and markedly easier to thicken, filter and wash than when the acid leach is performed on the entire mass of raw ore.

The leached coarse residues, almost completely denuded of nickel and washed practically free of chlorides, are wasted. They represent about 50% of the original weight of ore taken and carry away less than 10% of its nickel. In composition these tails are largely free silica released from the acid soluble silicate minerals (olivine, serpentine, garnierite), plus varying amounts of the insoluble minerals present in the raw ore, like chromite, talc, asbestos, chlorite, etc.

The reduced amount of iron in the leach solutions (steps #3 and #4) renders the filtering and washing operations much more convenient and manageable than if the entire ore heads had been subject to acid attack; and the lesser amounts of fines and colloids and gelatinous hydroxides likewise greatly reduce the handling difficulties in commercial operations. Indeed, this difficulty of handling excessive volumes of iron and aluminum precipitates and colloidal silica, resulting from the wet extractions of silicate ores, has in the past been one of the principal reasons for rejecting this type of metallurgical treatment. It may be well to point out too that because of this relatively small quantity of iron in the filtrates, it is entirely feasible at this point (step #4) to make an iron nickel separation merely by stepwise neutralization, the iron hydrate, of course, being precipitated ahead of the nickel. This, however, introduces more precise operating controls which rather complicate the otherwise simple procedures so that it might not be advisable or desirable thus to deviate from the more convenient methods leading to the production of ferro-nickel.

In practice I have found that the weight of dry iron-nickel precipitate from step #4, obtained on neutralization of the filtrate solution with MgO, amounts to less than 10% of the original ore weight. A typical analysis of the material, dried at 100 deg. C., runs approximately

| | Percent |
|---|---|
| $Fe_2O_3$ | 40 |
| NiO | 13 |
| MgO | 4 |
| $SiO_2$ | 0 |

This precipitate, combined with the first classification fines of step #1, enriches the mixture and produces an easy smelting furnace feed of weight somewhat less than 45% of the initial quantity of ore taken. It assays roughly

| | Percent |
|---|---|
| $Fe_2O_3$ | 24 |
| NiO | 6 |
| MgO | 13 |
| $SiO_2$ | 33 |

Smelted to metal (step #5) with charcoal as reducing agent plus appropriate amounts of limestone flux, a satisfactory, commercial 20 to 30% nickel ferro-nickel can be made, carrying little or no sulphur, phosphorus or other objectionable impurity. In controlled smelting practice, it is possible to produce a uniform grade of metal with but trifling nickel loss in the slag so that the overall nickel recovery in the process should be around 90%.

The pure magnesium chloride liquors of step #6, carrying around 30% of $MgCl_2$ are evaporated in accord with well known principles to the normal $MgCl_2 \cdot 6H_2O$ and this is further heated in air to the dihydrate salt. Above 170 deg. C. the $MgCl_2 \cdot 2H_2O$ breaks down rapidly into its components, HCl, MgO and steam which are cyclically returned to the process, specifically to steps #2 and #4. I have found that about 65% of the original magnesia contained in the ore is thus recovered. About half of it, however, is consumed in the step #4 neutralizations, leaving around 150 pounds of MgO per ton of ore to be sold as a by-product of the ferro-nickel manufacture.

In summary, therefore, I have evolved a unique improvement on my former method of extracting the nickel from low grade silicate ores which proposes the use of all the procedures specified in the previous patent specifications but practiced in a manner which greatly simplifies the processing and thereby markedly reduces the work and the cost in commercial operations.

Having thus described my process, I claim:

1. A process for producing ferro-nickel from nickel silicate ores, which comprises subjecting the ore to classification to yield a fine fraction thereof and a coarse fraction thereof, leaching the coarse fraction with hydrochloric acid to yield a slurry of a solution of the metallic constituents of the ore plus gangue, neutralizing such solution to yield a precipitate containing iron and nickel, and smelting a mixture of such precipitate and such fine fraction to yield ferro-nickel.

2. A process according to claim 1, with the addition that the solution is neutralized with magnesium oxide.

3. A process according to claim 2, with the addition that the neutralization of the solution with magnesium oxide is carried out stepwise to yield ferric oxide from one step and to yield nickel oxide from another step.

4. A process according to claim 1, with the addition of separating the solution and gangue, neutralizing such separated solution with magnesium oxide to yield said precipitate, separating such precipitate from its mother liquor, and subjecting such mother liquor to high temperature evaporation and decomposition for reclaiming hydrochloric acid and magnesium oxide for reuse in the process.

5. A process for extracting ferro-nickel values from marginal silicate ores, which comprises hydraulically classifying such ore into substantially two-thirds coarse sands and one-third into suspended fines, leaching the coarse sands with hydrochloric acid for thus extracting said values therefrom, precipitating such values as hydroxides from leach liquors by the use of magnesium oxide as a precipitating agent, and subjecting a mixture of such hydroxides and the fines to smelting to yield ferro-nickel.

6. A process for producing nickel from nickel silicate ores, which comprises subjecting the ore to classification to yield a fine fraction thereof and a coarse fraction thereof, leaching the coarse fraction with hydrochloric acid to yield a slurry of a solution of the metallic constituents of the ore plus gangue, neutralizing the solution with magnesium oxide in a stepwise manner to yield ferric oxide from one step and to yield nickel oxide from another step, and smelting such nickel oxide to metallic nickel.

GEORGE W. PAWEL.

REFERENCES CITED

The following references are of record in the file of this patent:

UNITED STATES PATENTS

| Number | Name | Date |
| --- | --- | --- |
| 909,667 | Price | Jan. 12, 1909 |
| 1,091,545 | Sulman et al | Mar. 31, 1914 |
| 1,185,187 | Eustis et al | May 3, 1916 |
| 2,105,456 | Hubler et al | Jan. 11, 1938 |